United States Patent [19]
Dorey et al.

[11] 3,982,061
[45] Sept. 21, 1976

[54] DATA TRANSFER CONTROL APPARATUS

[75] Inventors: Howard Anthony Dorey, Godalming; Robert John Cooke, Farnborough, both of England

[73] Assignee: The Solartron Electronic Group Limited, Farnborough, England

[22] Filed: Apr. 23, 1975

[21] Appl. No.: 570,688

[30] Foreign Application Priority Data
May 1, 1974 United Kingdom............... 19155/74

[52] U.S. Cl.................................. 178/2 R; 178/3; 340/147 R; 340/163
[51] Int. Cl.² ........................................... H04Q 5/00
[58] Field of Search ............ 178/2 R, 2 C, 2 D, 2 E, 178/3, 4.1 R, 4.1 B; 179/2 R, 2 DP, 2 A; 340/167, 147 R, 163, 172.5

[56] References Cited
UNITED STATES PATENTS

| | | |
|---|---|---|
| 3,457,550 | 7/1969 | Gibson et al..................... 340/147 R |
| 3,509,538 | 4/1970 | Holden et al. .................. 340/167 R |
| 3,810,103 | 5/1974 | Ricci................................... 340/163 |

Primary Examiner—Thomas A. Robinson
Attorney, Agent, or Firm—William R. Sherman; Stewart F. Moore; Kevin McMahon

[57] ABSTRACT

In a multi-device data transmission system with source and acceptor devices linked by a data highway and handshake lines, provision is made for automatically adjusting the delay of the handshake cycle to suit the highway length and other determinative factors. This is achieved in that the acceptors do not accept data until told so to do via one handshake line, whereas the source is only allowed to issue this command when it has been told via another handshake line that all acceptors have seen the data. The system determines its own delay in this way and automatically adapts the delay to whatever length of highway is employed, whether a fraction of a meter in a circuit board or several tens of meters in inter-rack wiring.

5 Claims, 4 Drawing Figures

DATA TRANSFER CONTROL APPARATUS

GENERAL BACKGROUND

The present invention relates to data transmission systems of the bit-parallel, byte-serial type in which more than two devices are linked to a data highway by means of individual interface circuits, hereinafter referred to simply as interfaces. Each device can act as a talker or source of data or as a listener or acceptor of data and at least one device can act as the system controller. Unless unduly long fixed periods are allowed for the transmission of bytes of data it is necessary to use so-called handshake signals to supervise the exchanges of data. Such signals are carried by control lines parallel to the data highway. These lines will be called handshake lines and carry two level signals.

In systems which only link two devices, two handshake lines suffice to ensure reliable exchange of data. The source device drives one line to a true level indicating Data Available. The acceptor device responds to this by driving the second line to a true level indicating Data Seen. The source responds in turn by driving the one line false to tell the acceptor to use the data. Having done this the acceptor drives the second line false to indicte that the data has been used. The system therefore utilizes the false to true and true to false transitions of both handshake lines, so that four meaningful signals can be interchanged in the handshake cycle using only two two-level lines. This simple scheme cannot be used when there are more than two devices linked by the highway and there may be, in any given exchange of data, a plurality of acceptor devices. This inevitably arises in that data includes address data sent from the controlling device to the other devices. It is not possible to indicate Data Seen by all acceptor devices by one transition and Data Used by all acceptor devices by the other transition of the second line. One such transition is logically forced to occur when only one device has seen or used the data (since Data Used is logically Not Data Seen).

It has already been proposed to use more than two handshake lines, for example in various drafts of Technical Committee No. 66 of the International Electrotechnical Commission, relating to Standard Interface Systems. One such proposal, as well as the present invention will be explained with reference to the accompanying drawings.

Figure 1:
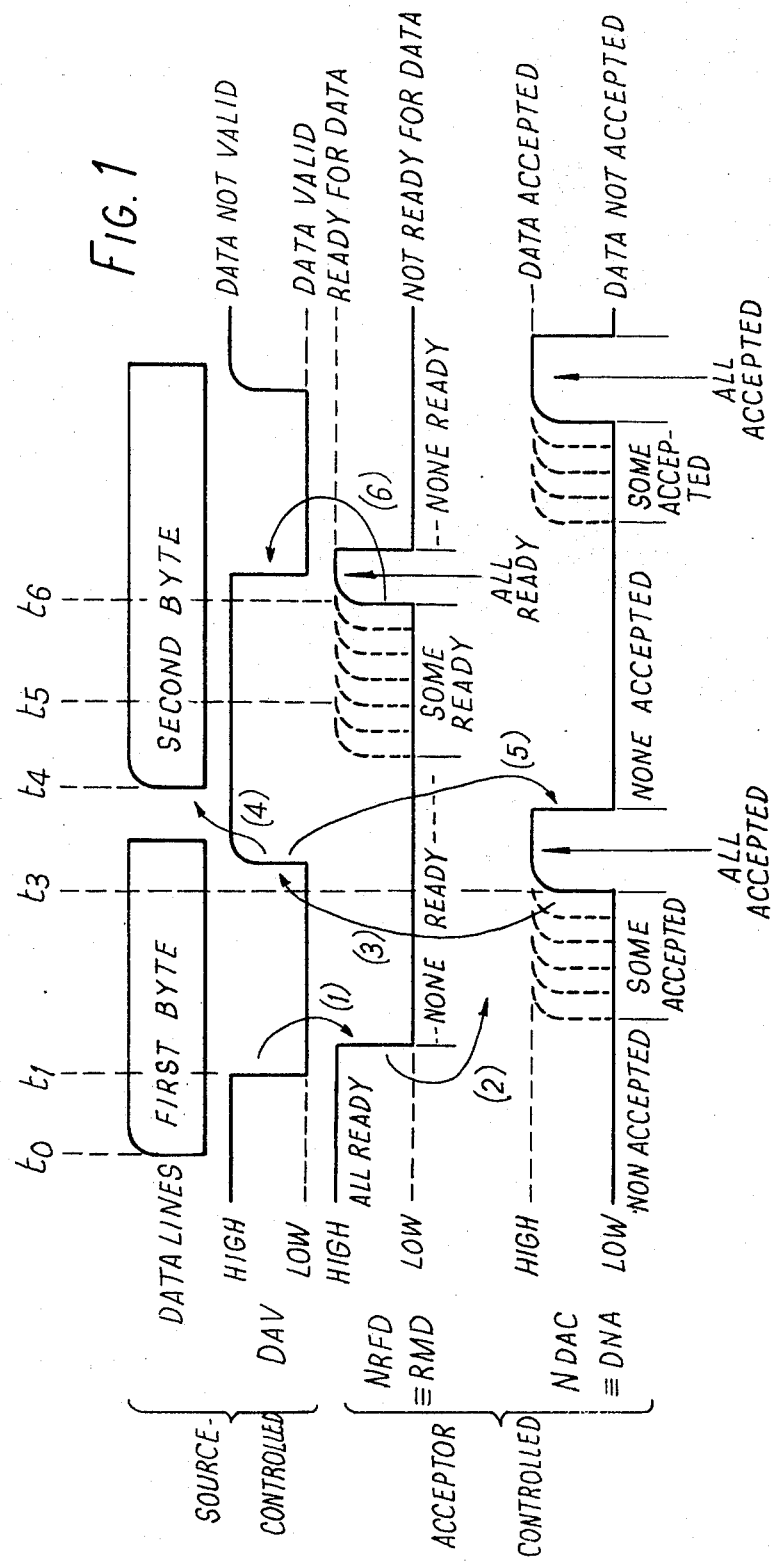
FIG. 1 shows handshake signals as proposed by the said Committee.

For the purposes of the present description, it is the logical levels of the two-level signals which matter and these levels will be denoted true and false in accordance with whether the condition denoted by the signal does or does not exist. Voltage levels will be called high and low and, as is well known, true ad false may correspond respectively to high and low or respectively to low and high. The latter convention is adopted in the drawings herein.

DESCRIPTION OF PRIOR ART

Referring to FIG. 1, the three handshake lines employed are one line controlled by the source and two lines controlled by the acceptors. The source line carries the signal DAV, meaning Data Available (or Data Valid). The acceptor line is NDAC, i.e., the logical inversion of DAC, meaning Data Accepted. NDAC is thus Data Not Accepted and may also be denoted DNA. The other data line is NRFD where RFD means Ready for Data and NRFD means Not Ready for Data, which may also be expressed as Refuse More Data, i.e., RMD. A line is low if any device is pulling the line low and is only high when all devices with controlling terminals connected to the line have such terminals high.

At the start of an operation, NRFD and NDAC will be high and low respectively. At $t_0$ the source makes the first byte available and then allows a fixed delay $t_0$ to $t_1$ to allow time for data to settle at the acceptors. At $t_1$ the source puts DAV low and the acceptors react, arrow 1, by putting NRFD low and by accepting the data, arrow 2. The arrows denote causal relationships. At $t_3$ the last acceptor has accepted the data and NDAC goes high.

This causes DAV to go high; see arrow 3. DAV going high causes two events. One, indicated by arrow 4, is the change to the next byte of data at $t_4$ and the other, arrow 5, is setting NDAC low.

$t_4$ corresponds to $t_0$ and a delay to $t_5$ is now provided, corresponding to the delay $t_0$ to $t_1$. However, DAV does not go low at $t_5$ because NRFD is still low - only some acceptors are ready for more data. NRFD goes high at $t_6$ and then, arrow 6, DAV goes low to continue as from $t_1$.

The time available for data to settle may be quite long as shown by the delay from $t_4$ to $t_6$. However it is only possible to rely on the built-in delay as from $t_0$ to $t_1$ for the settling time.

It is well known that the problem of "skew" limits the speed at which data may be exchanged via multi-wire highways. Skew is the difference in transmission times for different bits arising from the different effective inter-wire capacitances existing when a pair of wires carry two like bits and when they carry two unlike bits, and may be expressed as a ratio of the longest transmission time to the shortest transmission time. The aforesaid built-in delay must be long enough to cater for the problem of skew; otherwise an acceptor will accept unsettled data including possibly erroneous bits. As against this, it is important to keep the delay as short as possible to avoid slowing the data exchange unacceptably. In view of these conflicting requirements, the latest proposals of the aforementioned Committee include limiting the total length of highway in a system having up to 15 devices to no more than 20 meters. This correspondingly limits the skew and allows the built-in delay to be reasonably short, e.g. one microsecond. However, such a limitation on length creates its own severe problems. Indeed, 20 meters is barely, if at all, sufficient to interconnect 15 devices all mounted in the same rack, let alone devices spread around a laboratory or plant. On the other hand, a built-in delay of 1 microsecond is far too long for applications in which the lines are short, e.g., in printed circuit boards and constitutes an undesirable speed limitation.

THE INVENTION

The object of the present invention is to provide an improved system which enables longer highways to be provided, which requires no built-in delay, and which will always create whatever delay is required by existing circumstances, thereby to achieve the best possible speed of data exchange in such circumstances.

In the invention, the devices are linked to a data highway and to first, second and third handshake lines by means of individual interfaces, the interfaces being arranged to control the exchange of data between a source device and a plurality of acceptor devices. The first line carries a two-level signal determined by the interface of the source device and indicating whether or not validly acceptable data is available. The second line carries a two-level signal determined by the interfaces of the acceptor devices and indicating whether all or not all acceptor devices have seen data. The third line carries a two-level signal determined by the interfaces of the acceptor devices and indicating whether all or not all acceptor devices have accepted a byte of data. The interfaces are arranged to establish the following handshake cycle of operations 1 to 6:

1. First line to data available level;
2. Second line to level for data seen by all acceptor devices;
3. Signal from interface of the source device commanding the interfaces of the acceptor devices to accept data;
4. Interfaces of acceptor devices accept data in response to 3;
5. Third line to level for data byte accepted by all acceptor devices;
6. Change data byte and re-set first line to data available level to recommence the cycle.

The cycle as set out above does not refer to the resetting of the second and third lines to the not all seen and not all accepted levels. These operations can be fitted into the cycle as is most convenient.

In contrast to the prior art discussed above, the significant features of the cycle set out above are (3) and (2). The acceptors do not accept data until the source tells them to do so and the source cannot issue this command until it has been told that all acceptors have seen the data. The system determines its own delay after signalling data available (1) and adapts this delay to whatever length of highway is employed.

The invention makes it possible to employ virtually any length of highway so long as the skew ratio is not greater than 3:1.

It is preferred that the signal referred to under (3) shall consist of the first line reverting to data not available level, while in fact leaving data available on the highway. This avoids the use of another handshake line dedicated to this function, although such an additional line could be employed if desired (in which case the first line would revert to data not available level simultaneously with the removal of data from the highway).

The prior art described above caters for the fact that acceptor devices may not be ready for more data immediately after they have accepted data by provision of the RMD (or NRFD) line. This line may not be necessary in the present invention and it may be arranged that an acceptor device is not permitted to say that it has seen data until it is also ready for more data. Therefore, only three handshake lines continue to be required. However, it is possible also to provide the RMD (or NRFD) line in a four handshake line system as shown below.

DETAILED DESCRIPTION OF THE INVENTION

The invention will be further described with reference to FIGS. 2 and 3 which are of the same nature as FIG. 1, described above.

Figure 2:
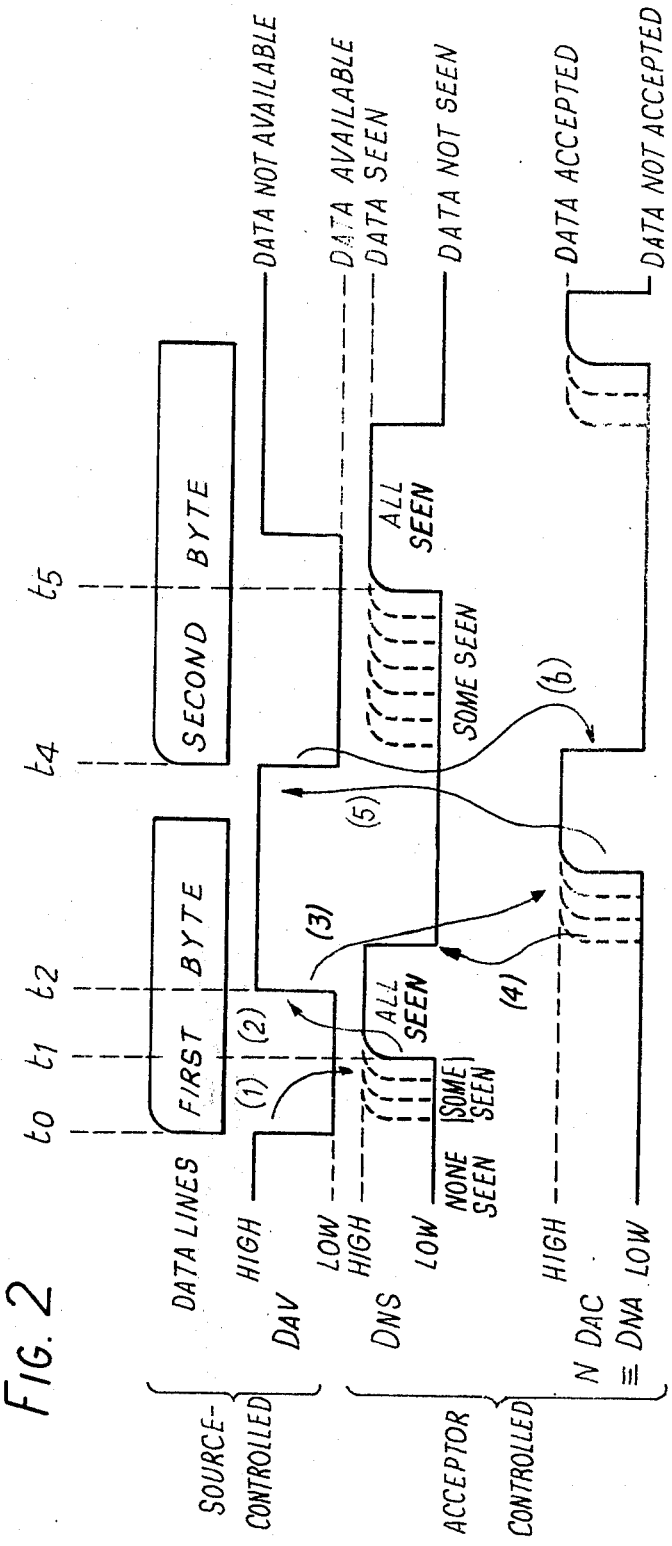
FIG. 2 shows handshake signals as proposed in accordance with the present invention.

Referring then to FIG. 2, a three wire system is shown in which DNS (data not seen) replaced NRFD of FIG. 1.

At $t_0$ the first byte is made available and DAV is simultaneously sent low (contrast FIG. 1). It is also possible to delay sending DAV low but any delay which would slow operation is undesirable as well as unnecessary. As arrow 1 shows, DNS goes high at $t_1$ when all acceptors have seen data. This may furthermore be conditional on all acceptors being ready to accept a byte of data. When DNS goes high, the source responds, arrow 2, by setting DAV high at time $t_2$ thereby to instruct the acceptors to use the data.

The delay from $t_0$ to $t_2$ automatically adapts itself to circumstances, in particular to the length of the highway, and the system therefore operates with the shortest delay which circumstances permit.

The acceptors accept data, arrow 3, and DNA goes high when all have been accepted, as in FIG. 1. When the first acceptor has accepted its data, DNS is caused to go low, arrow 4. When all acceptors have accepted the data, DNA going high causes the next data byte to be arranged on the lines, arrow 5, and DAV to be set to low. The setting of DAV low causes DNA to be set low, arrow 6, and the next cycle proceeds.

The delay from $t_4$ to $t_5$ in this next cycle is shown greater than the delay $t_0$ to $t_1$ and corresponds to the delay $t_4$ to $t_6$ of FIG. 1. This delay arises if it is arranged that DNS cannot go high until all acceptors have seen and are ready to accept the new byte. The separate RMD line of FIG. 1 is therefore not essential but may be included as shown in FIG. 3.

Figure 3:
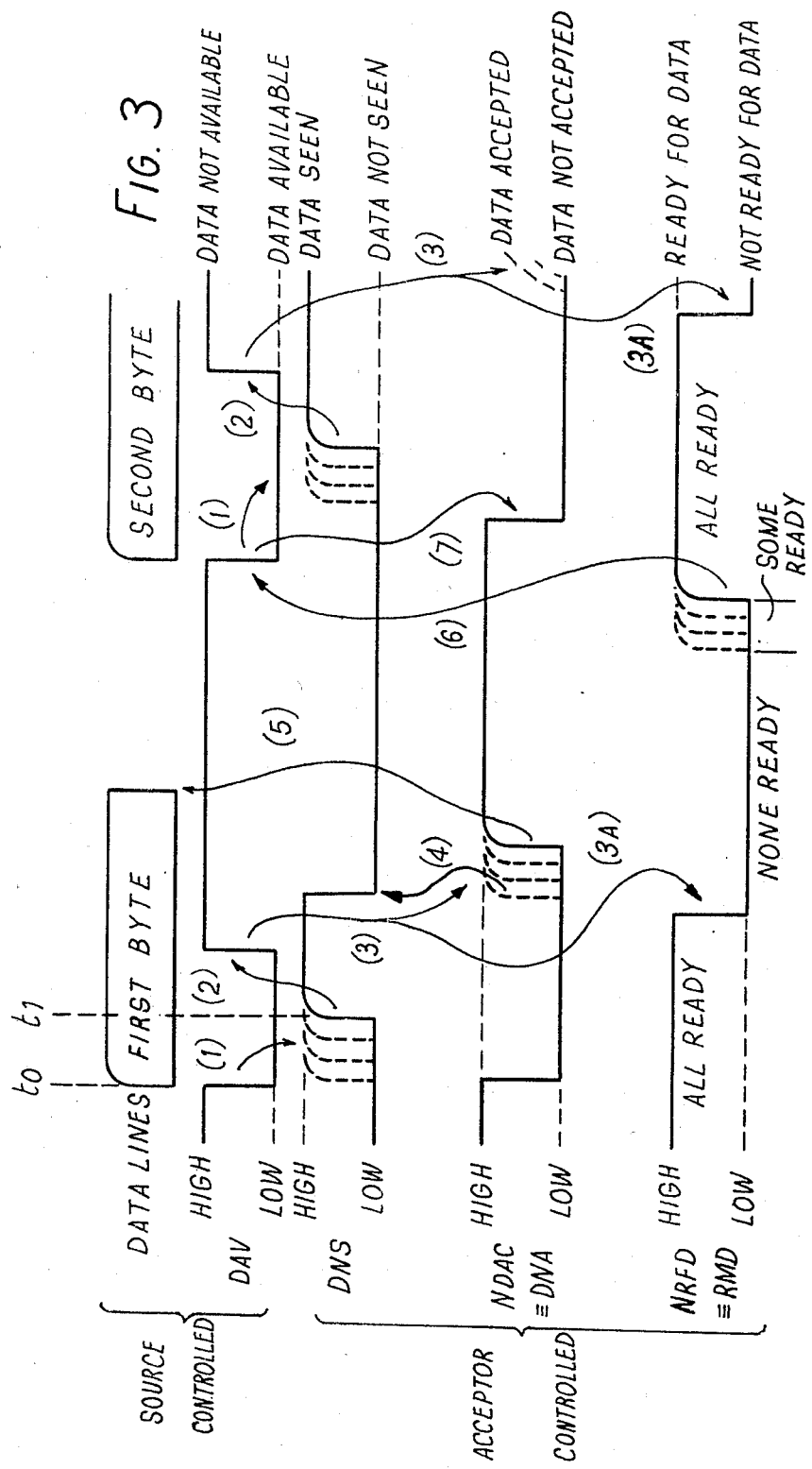
FIG. 3 shows modified handshake signals in accordance with the present invention.

FIG. 3 differs from FIG. 2 in that operation 5 now merely terminates the first byte. The second byte is not provided until, arrow 6, RMD goes high to indicate that all devices are ready for data. When DAV accordingly goes low, DNA is set low, arrow 7, this corresponding to arrow 6 of FIG. 2. DAV going high is used to return RMD to low, arrow 3A.

The handshake cycle tabulated above remains applicable to FIG. 3. Operation 6 is merely further qualified as being contingent upon a fourth line going to a level indicating that all acceptor devices are ready for more data.

Figure 4:
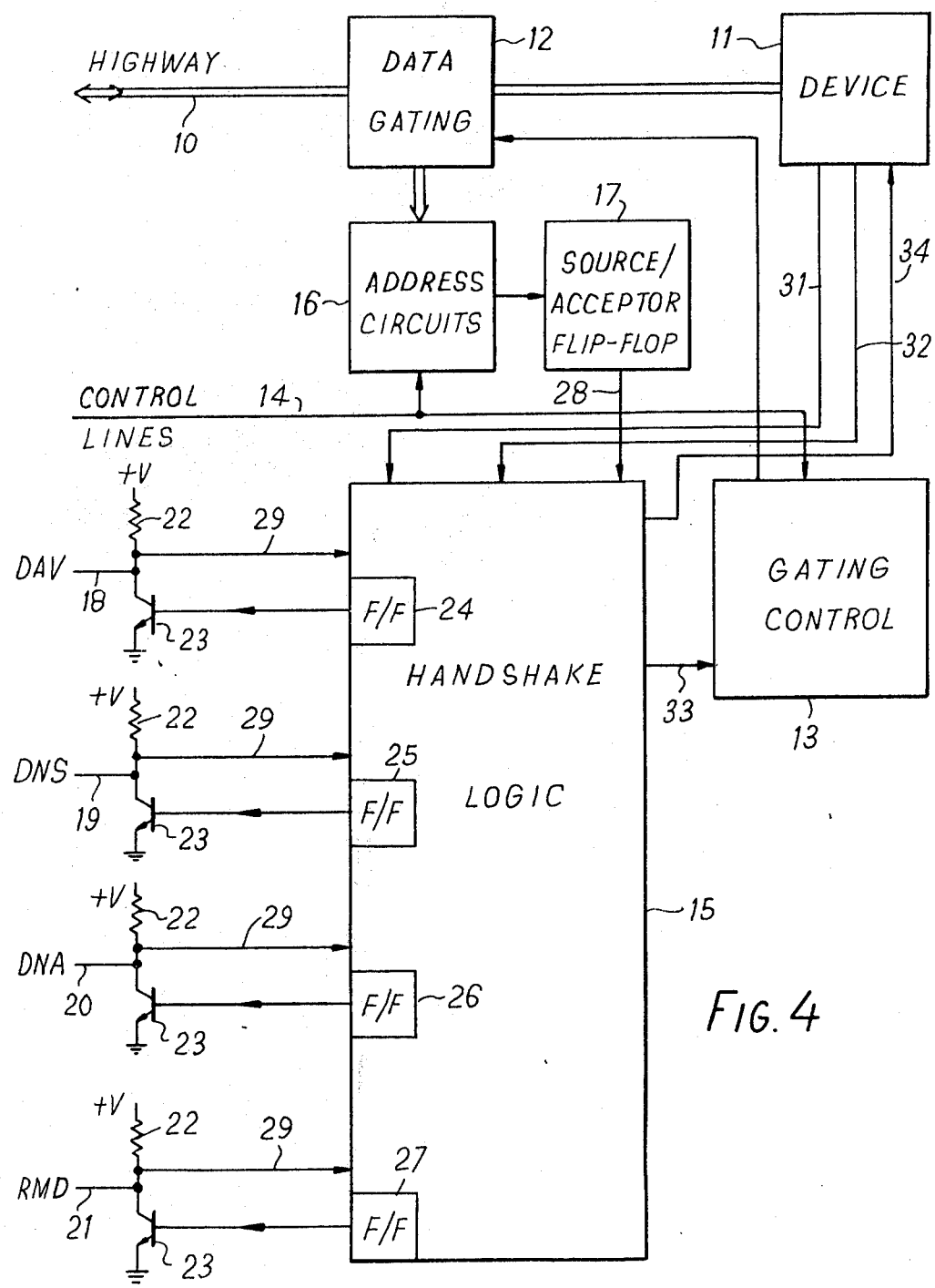
FIG. 4 is a block diagram of one interface suitable for a system embodying the invention.

FIG. 4 shows the essentials of one interface suitable for use in the case of FIG. 3. The interface may readily be simplified for the preferred case of FIG. 2. The data highway 10 is linked to the device 11 by data gating circuits 12. The data transfer is gated in the correct direction under the control of gating control 13 which is controlled in a manner known per se by signals on control lines 14 additional to the handshake lines, as well as by the state of interface logic 15. The control lines 14 act also in conjunction with the data highway 10 to control the addressing of the interface from the controlling device via address circuits 16, also as known per se. The addressing, as is known, establishes whether an interface is to act as a source or an acceptor and this condition is stored by a bistable flip-flop 17.

Four handshake lines 18, 19, 20 and 21 are provided for the signals DAV, DNS, DNA and RMD respectively. In this embodiment high is +V and low is ground. Each handshake line is connected to +V through a resistor 22 and to ground through a transistor 23. The transistors are controlled by bistable flip-flops 24 to 27 respectively included in the handshake logic and conduct when the flip-flops are true but are blocked when the flip-flops are false. It will be seen therefore that a handshake line is true or low when the corresponding transistor 23 of any interface conducts and is false or high only when the corresponding transistors 23 of all interfaces are blocked.

If the flip-flop 17 is set to the source state, the flip-flops 25, 26 and 27 are set unconditionally true and the state of flip-flop 24 is controlled in accordance with FIG. 3 by the logic 15. If the flip-flop 17 is set to the acceptor state, the flip-flop 24 is set unconditionally true and the states of flip-flops 25, 26 and 27 are controlled in accordance with FIG. 3 by the logic 15.

To avoid unnecessary description of details which will be apparent to those skilled in the art in that they do not differ in principle from the features of known handshake control circuits, the full logical circuits of the handshake logic 15 are not shown. From the foregoing description it will be apparent that the logic 15 is merely required to carry out straightforward logic operations in response to the following signals fed thereto:
1. Source/acceptor signal on line 28.
2. The handshake signals themselves fed back from lines 18 to 21, via connections 29.
3. A signal on line 31 provided by the device 11 to indicate whether or not the device is ready for data.
4. A signal on line 32 provided by the device 11 to indicate whether or not the device has accepted data.

The logic 15 responds to these signals to change the states of the handshake flip-flops 24 to 27 as required by FIG. 3, also to control gating control 13 via line 33 as required by arrow 3 of FIG. 3, and also to control the device 11 (when a source), via line 34 for the purpose of changing to the next byte of data in accordance with arrow 5 of FIG. 3. To give one specific example, if flip-flop 17 is set to acceptor and DAV goes low, DNS is responsively set high in accordance with arrow 1 of FIG. 3.

What is claimed is:
1. A bit-parallel, byte-serial data transmission system comprising a data highway and first, second and third handshake lines, a plurality of more than two devices and a corresponding plurality of interfaces linking said devices to said data highway and to said handshake lines, said devices including at least one data source device and more than one data acceptor device, said interfaces including logic means operable to control the exchange of data between a source device and a plurality of acceptor devices, the first line carrying a two-level signal determined by said logic means of the interface of the source device and indicating whether or not validly acceptable data is available, the second line carrying a two-level signal determined by said logic means of the interfaces of the acceptor devices and indicating whether all or not all acceptor devices have seen data, the third line carrying a two-level signal determined by said logic means of the interfaces of the acceptor devices and indicating whether all or not all acceptor devices have accepted a byte of data, and wherein said logic means of the interfaces are constructed and arranged to establish the following handshake cycle of operations (1) to (6):
1. First line to data available level;
2. Second line to level for data seen by all acceptor devices;
3. Signal from interface of the source device commanding the interfaces of the acceptor devices to accept data;
4. Interfaces of acceptor devices accept data in response to (3);
5. Third line to level for data byte accepted by all acceptor devices;
6. Change data byte and re-set first line to data available level to recommence the cycle.

2. A data transmission system according to claim 1, wherein the said signal in operation (3) consists of the first line reverting to data not available level while leaving data available on the highway.

3. A data transmission system according to claim 1, wherein operation (6) occurs in direct response to the third line going to the level for data byte accepted by all acceptor devices.

4. A data transmission system according to claim 3, wherein each interface is operable, when linking an acceptor device to said highway, to indicate to the second line that such acceptor device has seen data only when such device is also ready to accept the data.

5. A data transmission system according to claim 1, further comprising a fourth handshake line linking said interfaces and carrying a twolevel signal determined by said logic means of the interfaces of the acceptor devices and indicating whether all or not all acceptor devices are ready for more data, and wherein operation (6) occurs only when operation (5) is complete and the fourth line is at the level indicating all acceptor devices are ready for more data.

* * * * *